(12) United States Patent
Nicula

(10) Patent No.: US 10,853,909 B2
(45) Date of Patent: Dec. 1, 2020

(54) IMAGE PROCESSING APPARATUS

(71) Applicant: FotoNation Limited, Galway (IE)

(72) Inventor: Dan Nicula, Brasov (RO)

(73) Assignee: FotoNation Limited, Galway (IE)

( * ) Notice: Subject to any disclaimer, the term of this patent is extended or adjusted under 35 U.S.C. 154(b) by 101 days.

(21) Appl. No.: 16/180,925

(22) Filed: Nov. 5, 2018

(65) Prior Publication Data
US 2020/0143510 A1   May 7, 2020

(51) Int. Cl.
*G06T 3/00* (2006.01)
*G06T 1/60* (2006.01)
*G06T 3/40* (2006.01)
*G06T 3/60* (2006.01)

(52) U.S. Cl.
CPC .............. *G06T 3/0006* (2013.01); *G06T 1/60* (2013.01); *G06T 3/4007* (2013.01); *G06T 3/606* (2013.01)

(58) Field of Classification Search
CPC ....... G06T 3/0006; G06T 1/60; G06T 3/4007; G06T 3/606
See application file for complete search history.

(56) References Cited

U.S. PATENT DOCUMENTS

| | | | | |
|---|---|---|---|---|
| 2002/0012054 A1* | 1/2002 | Osamato | ................ | H04N 19/61 348/273 |
| 2009/0015717 A1* | 1/2009 | Arnao | .................. | H04N 7/0122 348/581 |
| 2010/0260433 A1* | 10/2010 | Zhang | ..................... | G06T 3/403 382/264 |
| 2014/0009568 A1* | 1/2014 | Stec | ........................ | G06T 5/006 348/36 |
| 2014/0098194 A1* | 4/2014 | Goma | ................ | H04N 5/23212 348/47 |
| 2017/0024404 A1* | 1/2017 | Tocchini | ............... | G06F 40/186 |
| 2017/0061639 A1* | 3/2017 | Georgescu | ................ | G06T 7/11 |
| 2019/0026864 A1* | 1/2019 | Chen | ..................... | G06T 3/4046 |

FOREIGN PATENT DOCUMENTS

| | | |
|---|---|---|
| WO | 2008/014472 A2 | 1/2008 |
| WO | 2010051147 A2 | 5/2010 |
| WO | 2014/005783 A1 | 1/2014 |
| WO | 2017/032468 A1 | 3/2017 |

OTHER PUBLICATIONS

Google Scholar Search Report.*

(Continued)

*Primary Examiner* — Qun Shen
(74) *Attorney, Agent, or Firm* — Lee & Hayes, P.C.

(57) ABSTRACT

The present invention relates to an image processing apparatus which determines an order for calculating output image pixels that maximally reuses data in a local memory for computing all relevant output image pixels. Thus, the same set of data is re-used until it is no longer necessary. Output image pixel locations are browsed to determine pixel values in an order imposed by available input data, rather than in an order imposed by pixel positions in the output image. Consequently, the amount of storage required for local memory as well as the number of input image read requests and data read from memory containing the input image is minimized.

19 Claims, 8 Drawing Sheets

(56) References Cited

OTHER PUBLICATIONS

European Patent Office International Searching Authority, International Search Report and Written Opinion for International Application No. PCT/EP2016/060827 filed May 13, 2016, Completed by the EPO on Sep. 9, 2016 and dated Sep. 23, 2016, 10 pages.
European Patent Office, Extended European Search Report for European Application No. 19196620.9 (Pub. No. 3582176) filed Sep. 11, 2019, Mailed by the EPO dated Oct. 31, 2019, 9 pages.
Roy P., et al: "VLSI Implementation of Fast Connected Component Labeling Using Finite State Machine Based Cell Network", Sixth Indian Conference on Computer Vision, Graphics & Image Processing, IEEE, Piscathaway, NJ, USA, Dec. 16, 2008, pp. 238-243, XP031409455.

* cited by examiner

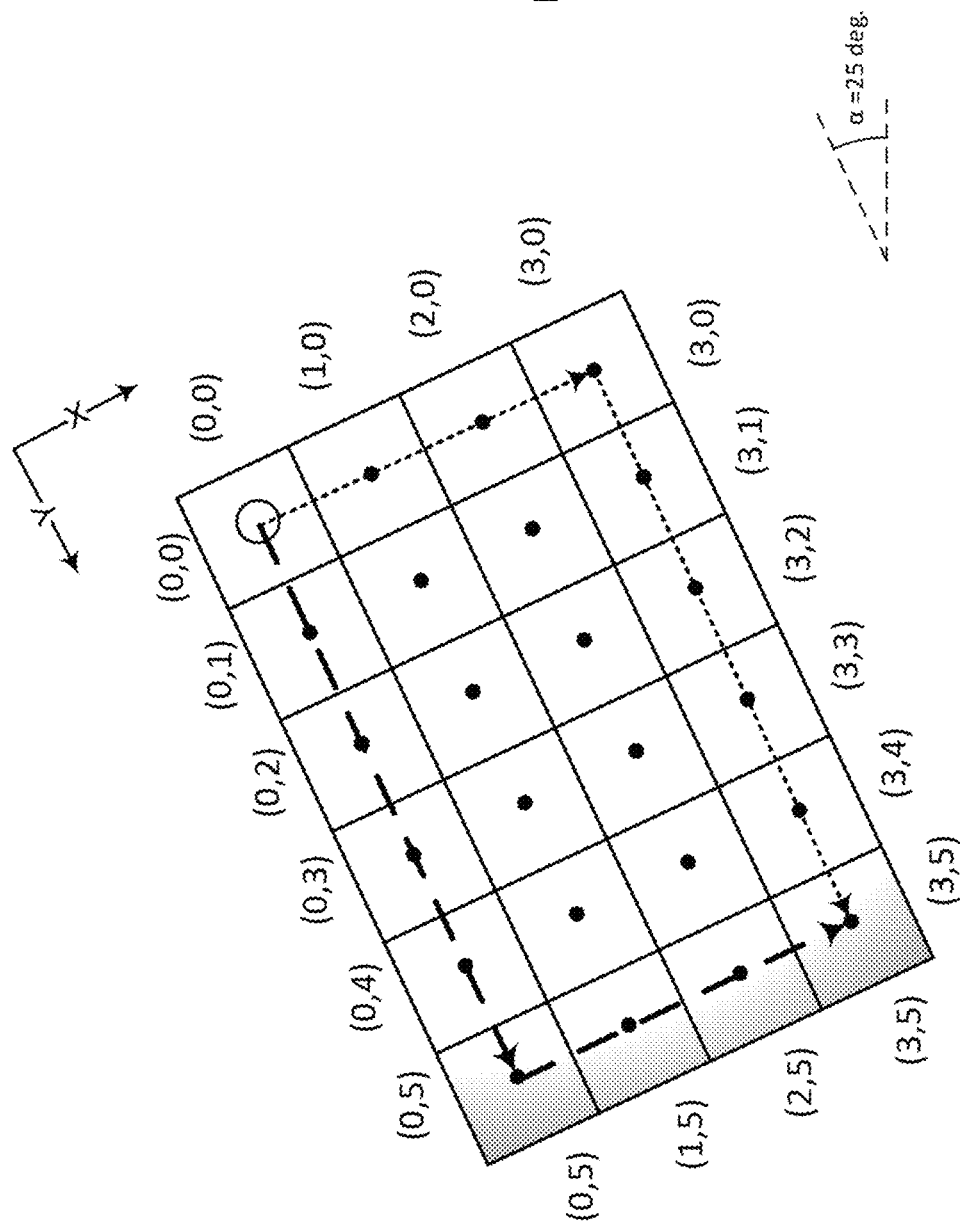

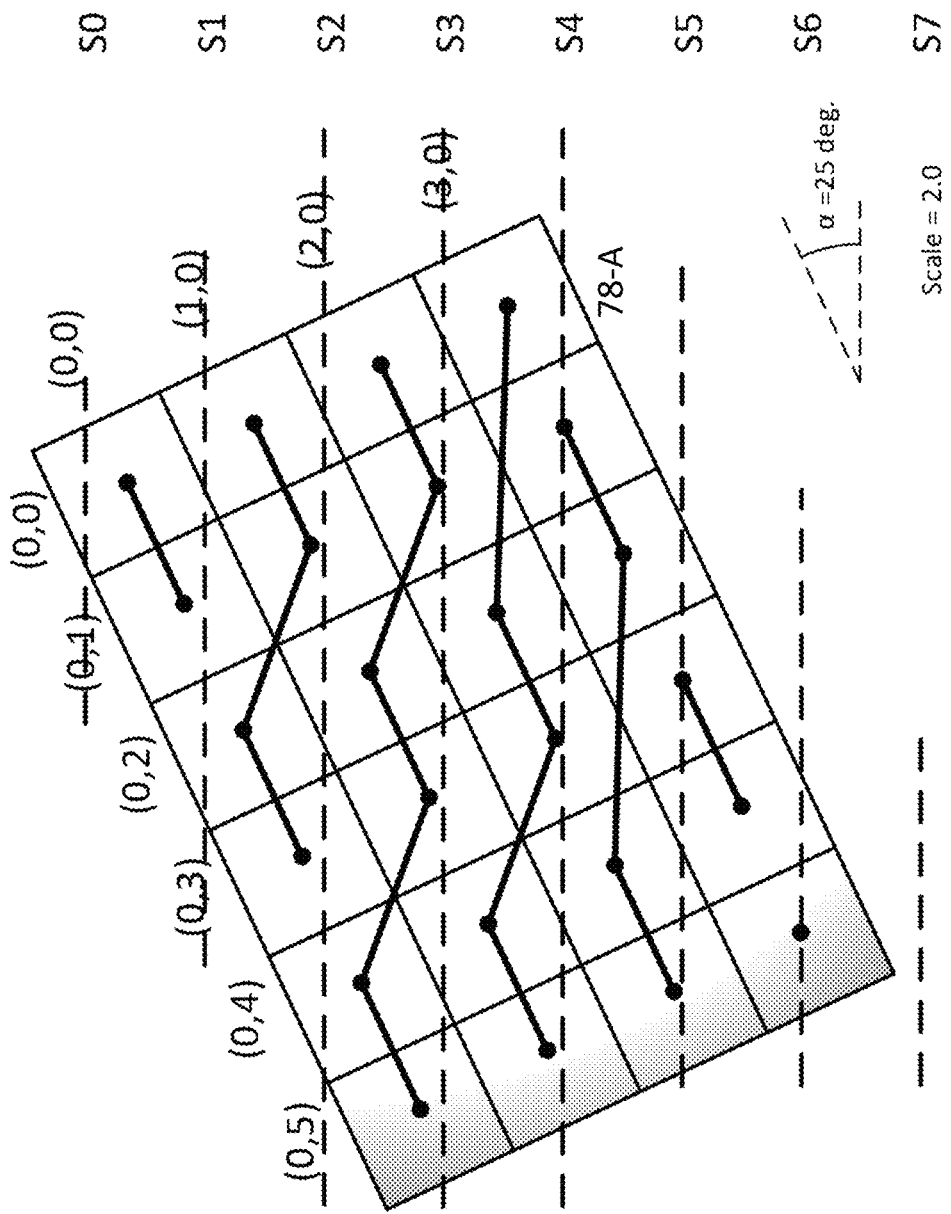

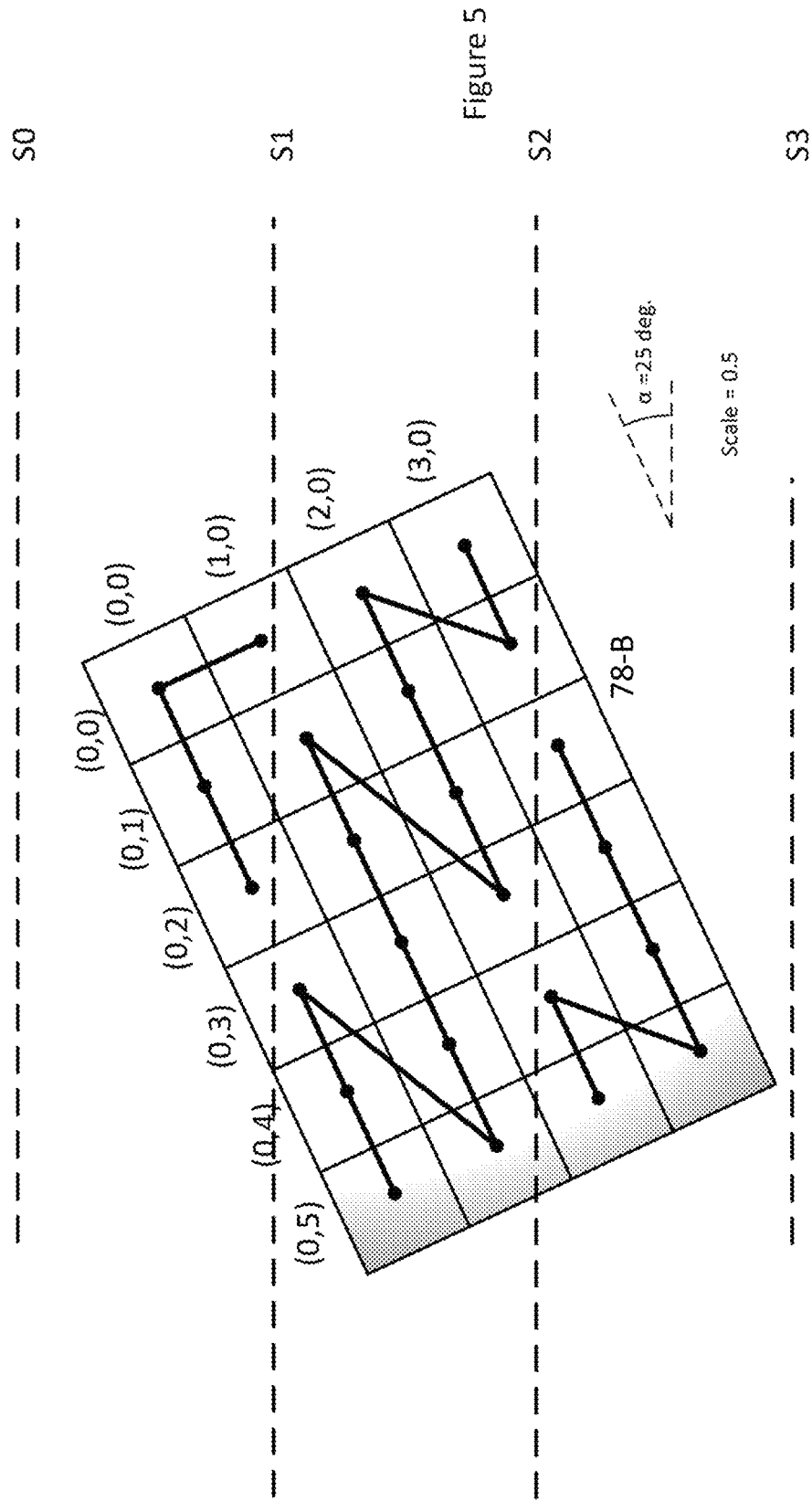

Figure 6

| State code | Arch index | current state | top edge | right edge | up | down | submit (follow) | follow | store (down) | next state |
|---|---|---|---|---|---|---|---|---|---|---|
| 1 | 1 | initial | X | X | Middle* | X | 1 | Current | 0 | regular |
| 1 | 2 | initial | X | X | Bottom* | X | 0 | Current | 0 | single up |
| 2 | 3 | regular | X | 0 | Top | Middle | 1 | Down | 0 | regular |
| 2 | 4 | regular | X | 1 | Top | X | 0 | end | 0 | idle |
| 2 | 5 | regular | 0 | X | Top | Bottom | 0 | Up | 0 | single down |
| 2 | 6 | regular | 1 | X | X | Bottom | 0 | end | 0 | idle |
| 2 | 7 | regular | 0 | 1 | Middle | X | 1 | Up | 0 | single up |
| 2 | 8 | regular | 0 | 0 | Middle | Middle | 1 | Up | 1 | *single up double* |
| 2 | 9 | regular | 1 | X | X | Middle | 1 | Down | 0 | single down |
| 2 | 10 | regular | 0 | X | Middle | Bottom | 1 | Up | 0 | regular |
| 3 | 11 | single down | X | 0 | X | Top | 0 | Down | 0 | single down |
| 3 | 12 | single down | X | 1 | X | X | 0 | end | 0 | idle |
| 3 | 13 | single down | X | 0 | X | Middle | 1 | Down | 0 | regular |
| 3 | 14 | single down | 0 | X | X | Bottom | 0 | Down | 0 | single up |
| 3 | 15 | single down | 1 | X | X | Bottom | 0 | end | 0 | idle |
| 4 | 16 | single up | 0 | X | Top | X | 0 | Up | 0 | single down |
| 4 | 17 | single up | 1 | X | X | X | 0 | end | 0 | idle |
| 4 | 18 | single up | 0 | X | Middle | X | 1 | Up | 0 | regular |
| 4 | 19 | single up | X | X | Bottom | X | 0 | Up | 0 | single up |
| 5 | 20 | single up double | 0 | X | Top | X | 1 | stored | 0 | initial |
| 5 | 21 | single up double | 0 | X | Middle | X | 1 | Up | 0 | single up double |
| 5 | 22 | single up double | 1 | X | X | X | 1 | stored | 0 | initial |

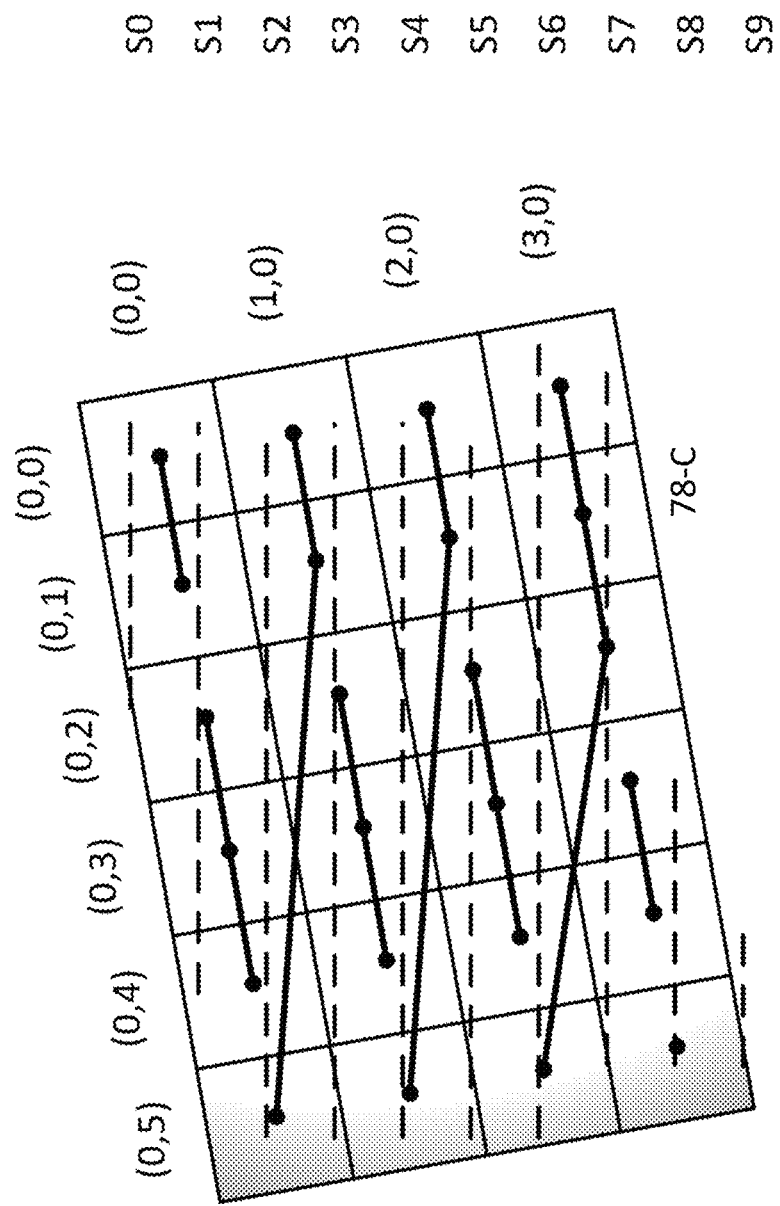

IMAGE PROCESSING APPARATUS

FIELD

The present invention relates to an image processing apparatus for performing a combined sample and rotate of an input image.

BACKGROUND

Referring now to FIG. 1, as disclosed in PCT Application WO2017/032468 (Ref: FN-469-PCT), there are many applications where it can be desirable for a processing module, whether software or hardware based, to receive a fixed size image. For example, neural networks may need to run on rectangular images having fixed dimensions in pixels (width and height), as well as perhaps a subject in a given orientation and centred within the image.

Original images may not meet these constraints because subjects can be at various distances from a camera and the subject can be rotated relative to the camera.

In the example shown in FIG. 1, it is desirable for a re-sampling and rotation engine 10 to produce a fixed size image 12 with W×H dimensions of 4×6 pixels for subsequent processing.

If we superimpose the output image 12 on an input image 14 where the region of interest (ROI) including a subject is at a higher resolution, in this case 10:4, than required for the output image and at an angle $\alpha$, it can be seen that multiple input image pixels need to be interpolated to produce each output pixel value. So, for example, for an input image ROI to output image ratio of 2:1 and with bilinear interpolation, 16 input image pixels are required to produce a single output pixel value. Thus, depending on the relative size of the ROI and the output image 12 and the type of interpolation used, at least some input pixels can be involved in the calculation of multiple output pixels.

It is an object of the present invention to provide an improved hardware solution for re-sampling (either up-sampling or down-sampling) an input image and rotating it before subsequent processing.

SUMMARY

According to the present invention there is provided an image processing apparatus according to claim 1.

Embodiments of the present invention determine an order for calculating output image pixels that maximally reuses data in a local memory for computing all relevant output image pixels. Thus, the same set of data is re-used until it is no longer necessary. Output image pixel locations are browsed to determine pixel values in an order imposed by available input data, rather than in an order imposed by pixel positions in the output image. Consequently, the amount of storage required for local memory as well as the number of input image read requests and data read from memory containing the input image is minimized.

Embodiments read a limited number of stripes from an input image in bursts covering a required width of an input image, not only an area around a pixel.

The increased efficiency comes from using the same set of data (stripes) to compute all the output image pixels that fit between the stripes, even if they are not adjacent pixels.

The task of reading the necessary input image data from memory can overlap (in time) with the computation of output image pixel values so that the system can perform at a much faster data-rate compared with doing so sequentially.

Embodiments of the invention can work both for fractional down-sampling, scale [1 . . . 2) and for fractional up-sampling, scale [0.5 . . . 1). In the case of down-sampling, an additional integer down-sampling can be implemented, for example, with a scale [1 . . . 512].

BRIEF DESCRIPTION OF THE DRAWINGS

An embodiment of the invention will now be described by way of example with reference to the accompanying drawings, in which:

FIG. 3 illustrates an indexing scheme for an output image employed in an embodiment of the present invention;

FIG. 4 illustrates an order of output image pixel processing in a down-sampling example of an embodiment of the present invention;

FIG. 5 illustrates an order of output image pixel processing in an up-sampling example of an embodiment of the present invention;

FIG. 6 is a state table for a finite state machine employed by the re-sampling and rotating engine of FIG. 2 to determine an order for calculating pixel values for an output image;

FIG. 9 illustrates an order of output image pixel processing in another down-sampling example of an embodiment of the present invention.

DESCRIPTION OF THE EMBODIMENT

Figure 1:
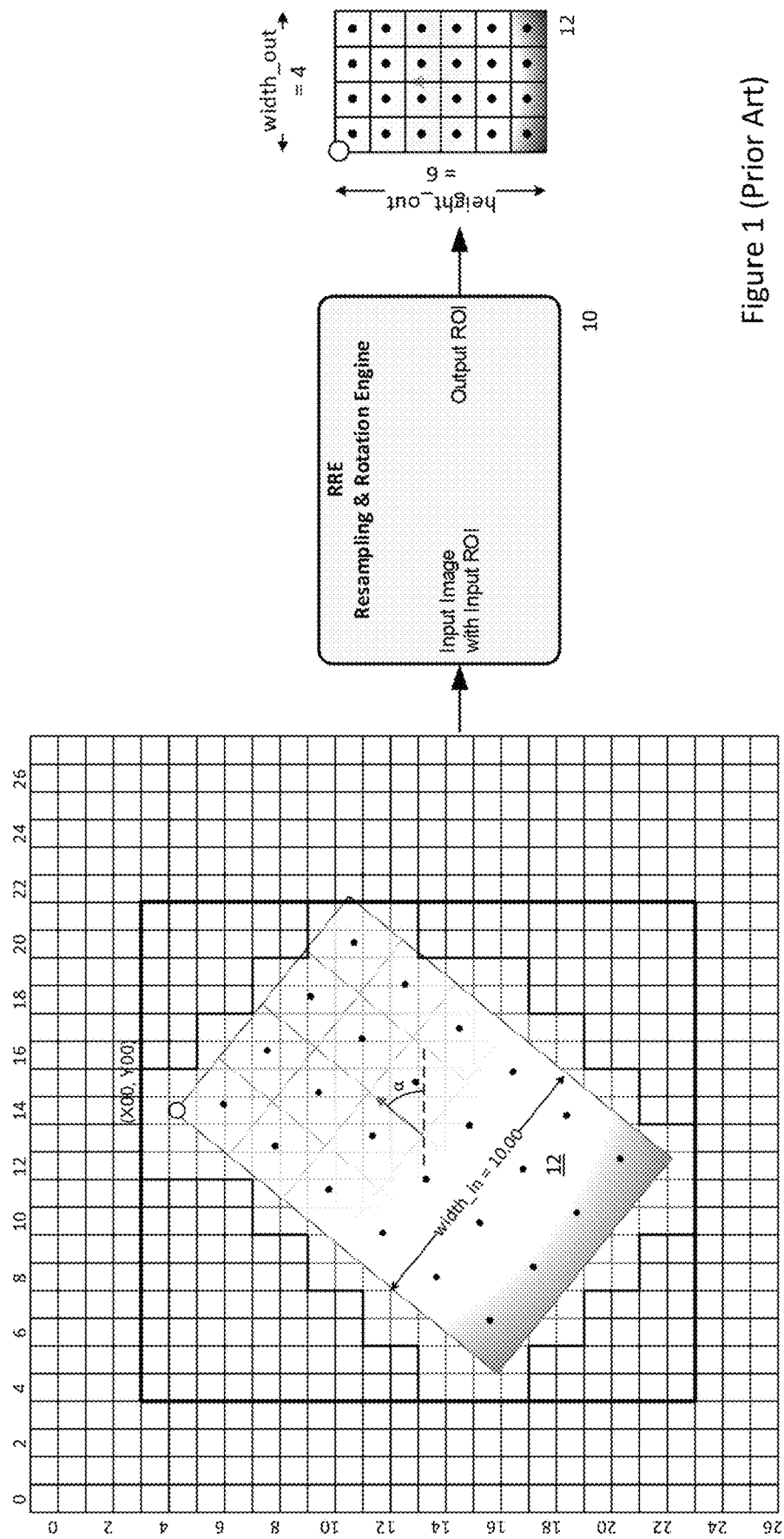
FIG. 1 illustrates the function of a re-sampling and rotation engine where a region of interest (ROI) within an input image is converted to an output image with fixed dimensions.
Figure 2:
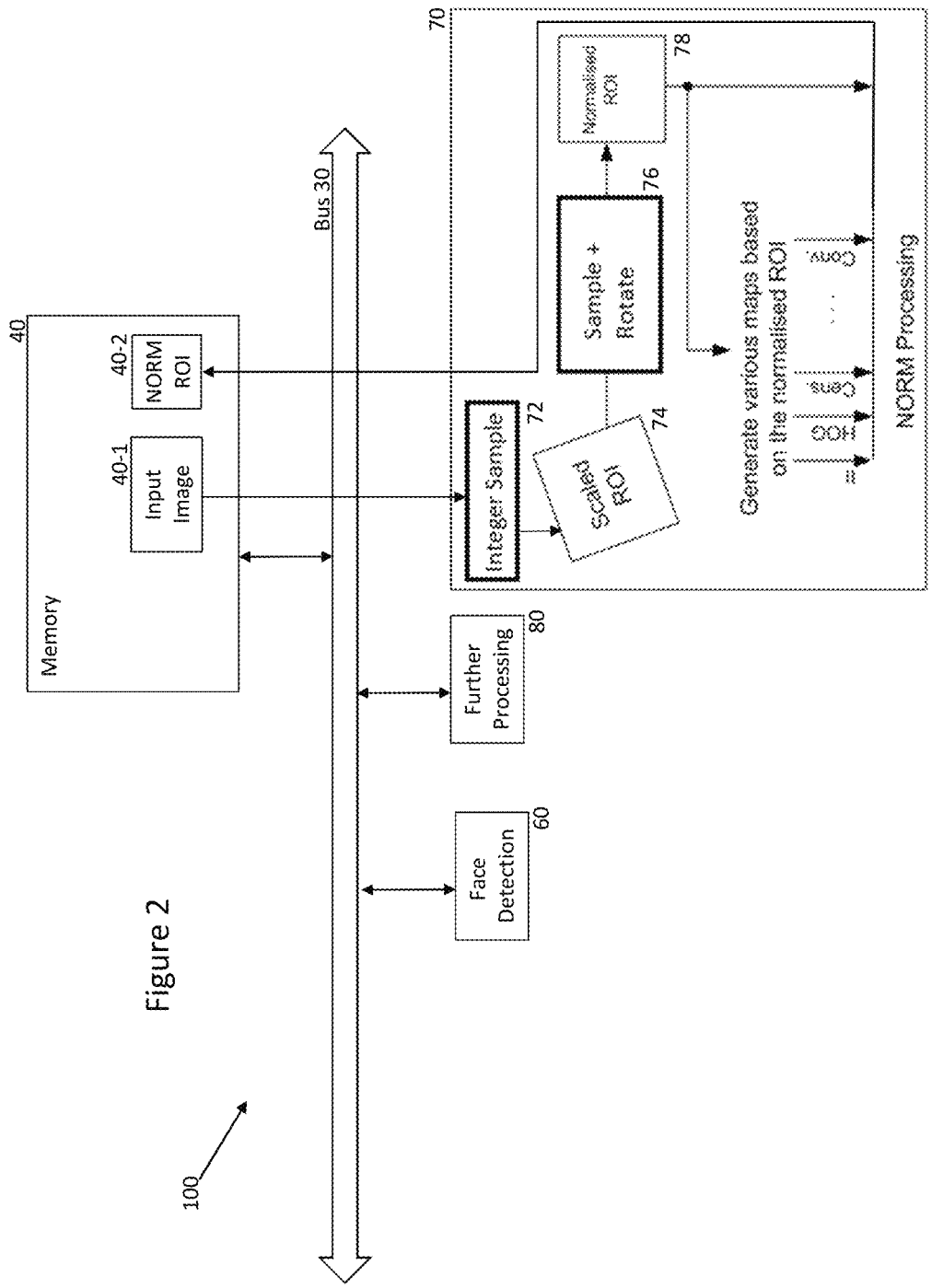
FIG. 2 illustrates a system including a re-sampling and rotation engine according to an embodiment of the present invention.

Referring now to FIG. 2, there is shown a system 100 including a normalisation module 70 including a sample and rotate engine 76 according to an embodiment of the present invention. As described in PCT Application WO2017/032468 (Ref: FN-469-PCT), an input image 40-1 containing a region of interest (ROI) is stored in main memory 40.

The ROI within the input image 40-1 can be detected and tracked from image to image using for example a face detection module 60 and meta-data indicating the location of any such ROI within the image 40-1 can either be stored with the image or in any other suitable portion of memory 40 where the data can be retrieved by other image processing modules.

In the embodiment, a sampling module 72 within the normalisation module 70 reads at least a portion of the input image bounding the ROI from main memory 40 across a system bus 30 while simultaneously integer sampling the input image to provide an intermediate input image 74 in local memory. As in PCT Application WO2017/032468 (Ref: FN-469-PCT), the sampling module 72 can employ average or nearest-neighbour sampling.

In the embodiment, the ROI within the intermediate input image 74 is within a scale of [0.5 . . . 2) the required scale for a normalised ROI 78.

It will be appreciated that in variants of the illustrated embodiment, the input image 40-1 may be pre-scaled so that the ROI is within a scale of [0.5 . . . 2) the required scale for the normalised ROI 78 and so the sampling module 72 may not be required.

Such an embodiment is advantageous not alone for minimizing the size of a local buffer required by the sample and rotate engine 76, but also for minimizing the access required by the normalisation module 70 to the main memory 40 across the system bus 30.

In any case, the sample and rotate engine 76 samples and rotates the intermediate input image 74 to provide the required output image comprising the normalised ROI 78. This output image 78 can be further processed within the normalisation module 70 to generate various maps based on the normalised ROI 78 such as a histogram of gradient (HOG) map, a census map or one or more convolutions of the normalised ROI 78 and any of these along with the normalised ROI 78 can be returned to main memory 40 and stored 40-2 for subsequent processing by dedicated hardware modules such as module 80 or by applications running on a general purpose CPU (not shown).

The present description is based on the input image 74 being stored top to bottom and that the sample and rotate module 76 reads the input image 74 in stripes from top to bottom to produce the output image 78 with fixed dimensions corresponding to the ROI in the input image 40-1. Thus, the expressions top and bottom as well as left and right should be understood as relative terms in this context and in practice all described processing can be flipped if required.

A stripe is a rectangular (horizontal) shape in the scaled intermediate image frame/plane, built from one or more consecutive rows of the image 74. The number of rows in a stripe is a function of the extent of scaling from the intermediate input image 74 to the output image 78.

The term Scale is defined a ratio between the ROI within the intermediate image 74 and the output image 78. In the embodiment, where the sampling module 72 is employed—Scale will be any real number in the range [0.5 . . . 2). Scaleint is defined as the integer part of Scale; and Scalefract is the fractional scale, again having a range [0.5 . . . 2) and deduced from the formula: Scale=Scaleint*Scalefract.

The number of rows of the input image in each stripe is equal to the integer sampling scale, Scaleint. So, for downscaling by 2, each stripe contains 2 rows, whereas for scaling below 2 and above 0.5, each stripe contains 1 row. The number of columns is a multiple of Scaleint. A stripe extends horizontally to cover all the input pixels used to determine at least one pixel's value in the output image.

It will be appreciated that where the sampling module 72 is not employed, Scale could be any number. However, this would increase the number of rows per stripe and so increase the size of local buffer required by the sample and rotate module 76.

The sample and rotate module 76 employs a FIFO local buffer capable of storing two stripes of information, stripe_idx and (stripe_idx+1), from the intermediate input image 74, thus when the scaling module 72 is employed, local buffer storage for up to 4 rows extending across a maximum width of a ROI may be required. Note that it is not necessary to read an entire width of any given row of the intermediate input image 74 into the local buffer, only the extent of the input image required for calculating pixel values in the output image. This can be determined by knowing an x,y coordinate within the input image 74 of any pixel for the output image 78 (usually a corner or origin pixel is used), the scale of the ROI within the input image relative to the output image 78, an angle of inclination α of the ROI within the input image. The extent of each stripe to be read from the intermediate input image 74 can be determined stripe-by-stripe as each stripe is read from intermediate input image memory or these values can be pre-calculated so that they are available immediately a stripe is required from memory. Once the module 76 has completed processing of stripes stripe_idx and (stripe_idx+1) of the input image in the local buffer, processing advances by incrementing stripe_idx and reading information for stripe_idx+1 into the local buffer and displacing the information for the previous value of stripe_idx.

Referring now to FIG. 3, each location within an output image 78 is indexed with a location (xidx, yidx). In the embodiment, input image information can be flipped vertically or horizontally as required, for example, by swapping and/or inverting x, y coordinates when reading input image information, so that the angle of inclination a of the ROI within the input image 74 is 0°≤α≤90°, with the origin index (0,0) at the top-right.

Embodiments determine an order for determining pixel values within the output image 78 by browsing from an initial pixel location at one extent of the output image inside the corresponding input image area covered by the stripes in local memory towards the opposite extent. In the example described in more detail below, browsing is performed from left to right across the output image, but as indicated above, in alternative implementations, browsing could equally be performed in the reverse direction.

Referring to FIG. 4, to illustrate generally the manner of browsing and the order of calculating output pixel values, there is shown an example of a normalised ROI 78-A mapped onto the stripes S0 to S7 from a corresponding input image in this case with Scale=2. Thus, in this case, each stripe with indexes S0 . . . S7 comprises two rows of the input image.

The present embodiment operates so that when stripes S0 and S1 are in the local buffer, the initial left-most calculated output image pixel value is for index (0,1). Once a path from index (0,1) towards the right boundary is complete and the two pixel values at index (0,1) and (0,0) are calculated, stripe S2 is read into memory and output image pixel values from (0,3) towards the right boundary are calculated with the process continuing until the last path comprising only pixel (3,5) is read when stripes S6, S7 are in the local buffer.

It will be seen that when downscaling, once an initial left-most available pixel location has been found for a given pair of stripes in memory, only one continuous path of pixel values will be calculated until the right boundary is reached.

Referring to FIG. 5, there is shown an example of a normalised ROI 78-B mapped onto the stripes S0 to S3 from a corresponding input image in this case with Scale<1 (Scale=0.5. Scaleint=1, Scalefract=0.5). Thus, in this case, each stripe with indexes S0 . . . S3 comprises one row of the input image.

In this case, after processing stripes S0 and S1, it will be seen that when stripes S1 and S2 are in the local buffer, the left-most available output image pixel calculated is at index (0,5). During the traversal of the path from this location, when processing current index (0,5), a second path from index (1,5) becomes available. In the embodiment, this upper path is followed and once the upper path from index (0,5) is completed, the path which had begun at index (1,5) is then completed. Again, when processing index (1,3), another path from index (2,3) become available. Thus, once the path from index (1,5) completes at index (1,1), this lower path is followed and so on, until the path completes at index (3,0), In any case, once the path beginning from index (0,5) to the right boundary is complete, stripe S3 is read into memory and output image pixels from (2,5) are calculated. Again, during the processing of this path, at current index (2,5), a path from index (3,5) becomes available. Again, when the upper path from index (2,5) is completed at index (2,4), the process can return to complete the path from index (3,5) towards the right boundary—in this case stopping at index (3,2). Thus, it will be seen that in this case, the paths from the left-most available pixels (0,5) and (2,5) towards the right boundary are discontinuous. It will be seen that in an embodiment where the maximum up-sampling scale is greater than 0.5, a maximum of one incomplete path will be available at any time for any two stripes in memory and so the process of storing paths to be returned to as available paths are discovered does not need to be infinitely recursive. Nonetheless, if greater upscaling (less than 0.5) were to be permitted, then the process could be extended accordingly.

It will also be appreciated that in variants of this embodiment, rather than first taking an available upper path, the process could store an initial point for an upper path and complete this path when a lower path is completed, rather than vice versa as described above.

In any case, regardless of upscaling or downscaling, beginning at the origin, in the embodiment, the module 76 moves to a left-most pixel inside the stripes stored within the local buffer for the module 76. This can be done by advancing from the origin index location along the left boundary i.e. the path from (0,0) . . . (0,5) . . . (3,5) to an index location where the output ROI pixel lies outside the corresponding input image area covered by the stripes in local memory and then browsing from that index location to find an index location that lies inside the corresponding input image area covered by the stripes in local memory. If as in the case of pixel index (1,5) in FIG. 5, the process arrives at a left boundary before getting to a pixel lying outside the input image area covered by the stripes in local memory, then the process begins at the boundary pixel.

The module then browses from this initial index location until arriving at a location where it is not possible to browse to a further location within the area covered by the stripes in local memory. Once the module 76 arrives at this location for a pair of stripes in memory and having exhausted all available paths for those stripes, the local buffer is advanced by one stripe and processing recommences until the whole set of output image pixel values has been determined.

As will be seen from the examples of FIGS. 4 and 5, the order of determining output pixel values from the initial index location towards the right boundary i.e. the paths from the left-most available pixels towards the right boundary is generally not a simple raster order (unless the angle of inclination $\alpha=0$) and in the embodiment, the particular order is determined by a finite state machine (FSM) shown in FIG. 6 within the module 76 and described in more detail below.

Using the FSM, the module 76 operates as follows:
Receive, as input data, an initial index location (xidx0, yidx0) for the left-most output image boundary location that fits in or below the current set of stripes.
Starting from the initial index location, the module determines a sequence of output image index locations for which pixel values are to be calculated (submitted). The sequence starts from the left most available boundary location of the output image and browses towards the right side (i.e. any of (0,0) . . . (3,0) . . . (3,5), in FIG. 3).
A value for the pixel at each index location browsed to and within the boundaries covered by the stripes in memory is calculated, for example, by bilinear interpolation of 2×2 neighbor pixels. In the embodiment, this calculation comprises a bilinear interpolation of the 4 input image pixels surrounding an output image location—noting that for down-sampling, the 4 input image pixel values used for interpolation will in turn be a function of more than 4 input image pixels. Note that for an upscaling operation, the input image pixels used for calculating adjacent output image pixels might not change, merely the interpolated value according to the fractional change in relative location of the output image pixels to the input image pixels.
Browsing from any initial pixel of the stripe (xidx0, yidx0), comprises checking if an adjacent 2 pixels also fit between the set of stripes. Referring to FIG. 8, adjacent pixels have indexes as follows (in output image indexes):
Pixel up: (xidx0, yidx0−1)
Pixel down: (xidx0+1, yidx0)
The y coordinates for each of the up and down pixel indexes following an initial pixel are compared to the coordinates of the stripes stripe_idx and (stripe_idx+1) in memory to determine the relative position of the up and down pixels vs. the set of stripes in memory. Knowing the x,y coordinate within the input image 74 of the origin pixel (0,0) for the output image 78, the scale of the ROI within the input image relative to the output image 78 and the angle of inclination c of the ROI within the input image, the y coordinates of the up and down pixels in input image space can be calculated with a simple multiplication. Once these y coordinates are determined, there are 3 possibilities for the relative positions of each of the up and down adjacent pixels:
"T" (top): y<stripe_idx (the following pixel fits above an upper stripe)
"M" (middle): stripe_idx≤y<(stripe_idx+1) (the following pixel fits between the stripes)
"B" (bottom): y≥(stripe_idx+1) (the following pixel fits below the lower stripe)
Note that in FIGS. 4, 5 and 9, stripe boundaries are shown as lines simply to indicate whether input image ROI pixels lie above, within or below the pixel provided by any given stripes to be used in calculating output image pixel values.
Based on the type of each of the up and down pixels (T/M/B), the FSM of table presented in FIG. 6 along with the state transitions illustrated in FIG. 7 indicate to the module 76: a) if a following output image pixel value is to be submitted to the memory storing the output image 78; b) how to continue browsing from the current output image pixel index to following output image pixel index/indices; including c) if processing needs to return to a second path when a first path completes. If any output image pixel value is to be submitted, then as well as the y coordinate, its x coordinate in input image space also needs to be calculated before the input image pixel values surrounding the x,y coordinate location in the input image can be interpolated to provide the output image pixel value. Again, this can be calculated as described above for the y coordinate.
In case an up or down pixel reaches the right border (yidx=0 or xidx=width_o−1) of the output image, browsing of a given path stops. In the example, the width of the output image width_o is 4 and the height of the output image height_o is 6.
If the end of the output image has not been reached, a further stripe can be read from memory 74 into the buffer for the sample and rotate engine 76 and the above process repeated.

Figure 7:
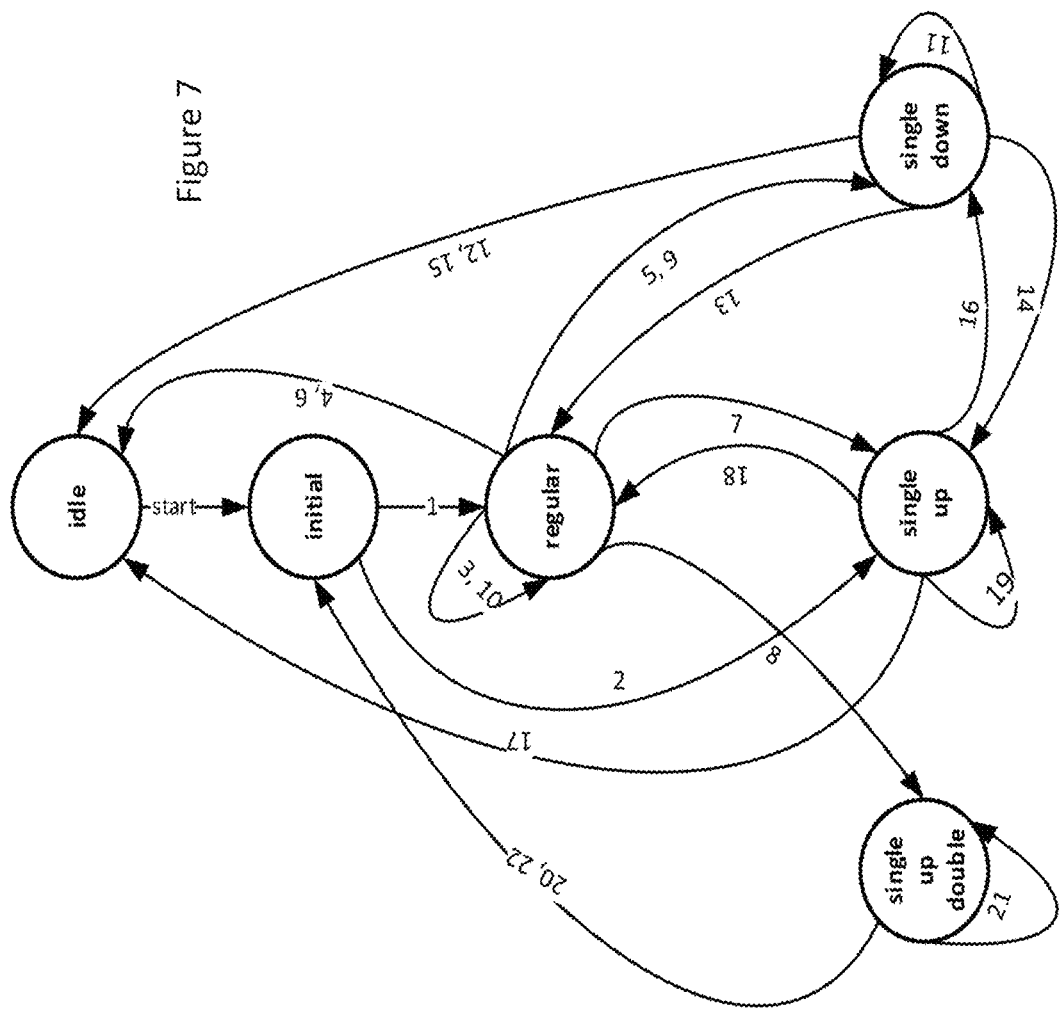
FIG. 7 illustrates the state transitions of the table of FIG. 6.
Figure 8:
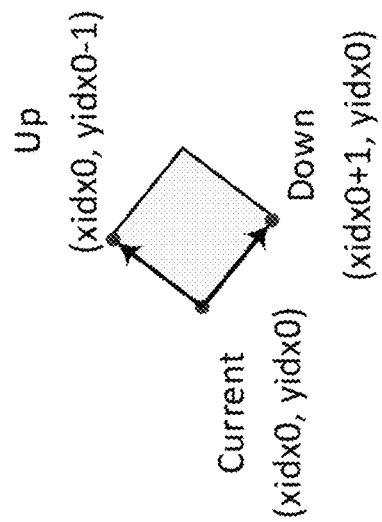
FIG. 8 illustrates up and down navigation from a current output image pixel.

Looking in more detail at FIGS. 6 and 7, in the present embodiment, the FSM state can be one of the following:

| Name | Functionality |
| --- | --- |
| Idle | Before the start or after the end of set of stripe processing. Once a new stripe is loaded into local memory and a left-most available pixel location for the area covered by the stripes in local memory has been found, the state advances to "Initial". |
| Initial | When processing the left-most available pixel after a stripe has been read into the local buffer. |
| Regular | A pixel followed as "current" pixel fits in the "middle" of stripes, so adjacent pixels in both directions (up and down) are browsed. The pixel in the up direction will be submitted. |
| Single up | Browse just to a pixel in the up direction - following a previous browse down from a Top pixel to a Bottom pixel. If an adjacent pixel is Bottom, browsing follows just in the up direction because down from a Bottom pixel will also be a Bottom pixel. |
| Single up double | This is a state where both Up and Down pixels (from a current pixel) fit within the area covered by the stripes in local memory. In this case, browsing follows in 2 directions. This is implemented by storing the coordinates of the "down" pixel and following the "up" pixel initially. Once browsing the up path is complete, browsing is restored from the splitting point (this case just occurs for up-sampling). |
| Single down | Browse just in the down direction due to a previous regular state being followed by Top and Bottom pixels. Abandon the bottom and follow the Top, but only down (because the top of top is also a top). |

"Follow" determines the next pixel to be considered "the current pixel" during the next state. The follow signal encoding is:

| follow value | Functionality |
| --- | --- |
| Current | This is for the initial point. If when in the initial state, an up pixel is "Middle", follow it as a regular point. If it is "Below" it cannot be submitted and Up is followed (as Single Up). |
| Up | Follow the pixel in the up direction. |
| Down | Follow the pixel in the down direction. |
| Stored | Follow the pixel stored previously, in the down direction. |
| End | Terminate the algorithm, due to reaching the edge of the ROI and browsed all possible pixels within the area covered by the stripes in local memory. |

Referring to FIG. 7, it will be seen that the "follow" value does not necessarily correspond with a next state value. For example, Arch 5, from current state=regular>follow=Up, next state=single down; whereas Arch 9, from current state=regular>follow=Down, next state=single down.

The submit signal is active when there is a followed pixel marked "M" (Middle). Its encoding is:

| submit value | Functionality |
| --- | --- |
| 0 | No submission for the current pixel (it fits on Top or on Bottom) |
| 1 | Submit according to follow direction |

In case a follow point is marked "M" (Middle), submit the point.

In case two follow points are marked "M" (Middle), the upper path is followed, and the remainder of the lower path is stored for subsequent processing. The stored path is restored when the initial path is complete.

Note that the present description has been based on bilinear interpolation where 4 input image points adjacent an output image location are used to determine a pixel value for the output image location. However, it will be appreciated that the invention applies equally to bicubic or other forms of interpolation.

So, referring back to FIG. 4, we can look at the state changes from within the table of FIG. 6 and labelled in FIG. 7 as the sample and rotate engine 76 browses through the output image 78-A as follows:

| Stripes set | States* [arches] | Node succession |
| --- | --- | --- |
| S0-S1 | idle (0, 1) > initial* [1] > regular* [10] > regular [4] > idle | (0, 1) > (0, 0) |
| S1-S2 | idle (0, 3) > initial* [1] > regular* [10] > regular (5) > single down [13] > regular* [7] > single up* [18] > regular [6] > idle | (0, 3) > (0, 2) > (1,1) > (1, 0) |
| S2-S3 | idle (0, 5) > initial* [1] > regular* [5] > single down* [13] > regular* [7] > single up [16] > single down* [13] > regular* [7] > single up* [17] > idle | (0, 5) > (0, 4) > (1, 3) > (1, 2) > (2, 1) > (2, 0) |
| S3-S4 | idle (1, 5) > initial* [1] > regular* [5] > single down* [13] > regular* [7] > single up [16] > single down [14] > single up* [18] > regular [4] > idle | (1, 5) > (1, 4) > (2, 3) > (2, 2) > (3, 0) |
| S4-S5 | idle (2, 5) > initial* [1] > regular* [5] > single down [14] > single up* [18] > regular* [7] > single up [16] > single down [12] > idle | (2, 5) > (2, 4) > (3, 2) > (3, 1) |

-continued

| Stripes set | States* [arches] | Node succession |
|---|---|---|
| S5-S6 | idle (3, 5) > initial [1] > regular* [7] > regular* [4] > idle | (3, 4) > (3, 3) |
| S6-S7 | idle (3, 5) > initial* [1] > regular [5] > single down [12] > idle | (3, 5) |

Similarly, referring to FIG. 5 we can look at the state changes from within the table of FIG. 6 and labelled in FIG. 7 as the sample and rotate engine 76 browses through the output image 78-B as follows:

| Stripes set | States* [arches] | Node succession |
|---|---|---|
| S0-S1 | idle (0, 2) > initial* [1] > regular* [10] > regular* [10] > regular* [9] > single down [15] > idle | (0, 2) > (0, 1) > (0, 0) > (1, 0) |
| S1-S2 | idle (0, 5) > initial* [1] > regular* [8] > single up double* [20] > initial* [1] > regular* [10] > regular* [8] > single up double* [21] > single up double* [20] > initial* [1] > regular* [10] > regular* [8] > single up double* [20] > initial* [1] > regular* [10] > regular [6] > idle | (0, 5) > (0, 4) > (0, 3) > (1, 5) > (1, 4) > (1, 3) > (1, 2) > (1, 1) > (2, 3) > (2, 2) > (2, 1) > (2, 0) > (3, 1) > (3, 0) |
| S2-S3 | idle (2, 5) > initial* [1] > regular* [8] > single up double [13] > initial* [1] > regular* [7] > single up * [18] > regular* [7] > single up [16] > single down [12] > idle | (2, 5) > (2, 4) > (3, 5) > (3, 4) > (3, 3) > (3, 2) |

*proper point found and submitted

Finally, referring to FIG. 9, there is shown a further example of the above disclosed embodiment operating at a scale 1.99:

| Stripes set | States* [arches] | Node succession |
|---|---|---|
| S0-S1 | idle (0, 1) > initial* [1] > regular* [10] > regular [4] > idle | (0, 1) > (0, 0) |
| S1-S2 | idle (0, 4) > initial* [1] > regular* [10] > regular* [10] > regular [5] > single down [14] > single up [19] > single up [17] > idle | (0, 4) > (0, 3) > (0, 2) |
| S2-S3 | idle (0, 5) > initial* [1] > regular [5] > single down [14] > single up [19] > single up [19] > single up [18] > regular* [7] > single up* [17] > idle | (0, 5) > (1, 1) > (1, 0) |
| S3-S4 | idle (1, 5) > initial [2] > single up* [18] > regular* [7] > regular* [7] > regular [5] > single down [14] > single up [19] > single up [17] > idle | (1, 4) > (1, 3) > (1, 2) |
| S4-S5 | idle (1, 5) > initial* [ ] > regular [5] > single down [14] > single up [19] > single up [19] > single up* [18] > regular* [7] > single up [17] > idle | (1, 5) > (2, 1) > (2, 0) |
| S5-S6 | idle (2, 5) > initial [2] > single up* [18] > regular* [7] > single up* [18] > regular [5] > single down [14] > single up [17] > idle | (2, 4) > (2, 3) > (2, 2) |
| S6-S7 | idle (2, 5) > initial* [1] > regular [5] > single down [14] > single up [19] > single up [18] > regular* [7] > single up* [18] > regular* [4] > idle | (2, 5) > (3, 2) > (3, 1) > (3, 0) |
| S7-S8 | idle (3, 5) > initial [2] > single up* [18] > regular* [7] > single up [16] > single down [12] > idle | (3, 4) > (3, 3) |
| S8-S9 | idle (3, 5) > initial* [1] > regular [4] > idle | (3, 5) |

*proper point found and submitted

So, in this case, the FSM states for stripes S1 and S2 above are as follows:

idle state, pixel with coordinates (0,4), go to initial state, the current pixel matches the stripes (fits between them both) and it is submitted (marked with *). The next state is according to arch [1] . . . .

regular state where the pixel (0,3) is submitted and the arch [10] goes to . . .

regular state where the pixel (0,2) is submitted and the arch [10] goes to . . .

regular state where the pixel does not match the stripes set (not marked with *) and the arch [5] goes to . . .

single down state, the current pixel does not fit between stripes (not marked with *) and the arch [14] brings FSM to the . . .

single up on arch [19] to . . .

single up on arch [17] to the end

Note that there are 3 * in the above list of States and these correspond to pixels from the column "Node succession" in the table above.

Note that the engine 76 may transition through more states than the number of pixel locations for which values are actually calculated as it browses across output image pixel locations testing for available paths where output image pixel locations lie inside the corresponding input image area covered by the stripes in local memory.

The invention claimed is:

1. An image processing apparatus for sampling and rotating a region of interest (ROI) of an input image to provide an output image of fixed dimensions, the ROI having a scale relative to the dimensions of the output image, the image processing apparatus configured to:
    successively read stripes of pixel values from the input image stored in a first memory into a second memory of said image processing apparatus, each stripe comprising an area extending across the region of interest in said input image, each stripe comprising pixel values for a number of rows of said input image, said number of rows being proportional to said scale;
    process said stripes by:
        determining an initial pixel location in said output image corresponding to an intersection between a boundary of said ROI and said area associated with one of said stripes in said second memory;
        browsing at least one path from said initial pixel location across output image pixel locations to locate one or more output image pixel locations lying within said area associated with one of said stripes in said second memory, said browsing comprising testing at least one output image pixel location adjacent to a browsed output image pixel location and outside said area associated with one of said stripes in said second memory;
        determining a subsequent path for at least one of said stripes, wherein determining said subsequent path for at least one of said stripes comprises determining a path from said at least one path associated with said initial pixel location to a pixel location within said area corresponding to said at least one of said stripes;
        for one or more output image pixel locations lying within the area of said input image provided by said stripes in said second memory:
            calculating a pixel value for said output image pixel location by interpolating a plurality of pixel values from said input image in said second memory surrounding said output image pixel location; and
            writing said pixel value to said first memory for storing said output image; and
        responsive to said browsing for said stripes in said second memory, replacing a stripe of input image information within said stripes with a subsequent stripe of input image information.

2. The image processing apparatus according to claim 1 wherein said stripes comprise a first stripe comprising a first area, a second strip comprising a second area, and at least one of the first stripe or the second stripe comprises two or more paths across the first area or the second area.

3. The image processing apparatus according to claim 1 wherein said scale ranges from [0.5 to 1) for up-sampling said input image and from [1 to 2) for down-sampling said input image.

4. The An image processing apparatus according to claim 1 further comprising an integer sampler configured to down-sample an acquired image as it is read from said first memory across a bus to cause said ROI within said input image to be at a scale of twice or less said output image.

5. The image processing apparatus according to claim 1 wherein said apparatus is configured to flip information as it is being read into said second memory so that an angle of inclination α of the ROI within the input image 74 is $0° \leq \alpha \leq 90°$.

6. The image processing apparatus according to claim 1 wherein said first memory is located across a bus from said second memory.

7. The image processing apparatus according to claim 1 wherein said boundary includes two adjacent sides of said output image and wherein said browsing comprises browsing towards a pixel location adjacent one of two opposite adjacent sides of said output image.

8. The image processing apparatus according to claim 1 where said at least one path comprises a single path when down-sampling said input image.

9. The image processing apparatus according to claim 1 wherein said at least one path comprises a plurality of discontinuous paths when up-sampling said input image.

10. The image processing apparatus according to claim 1, further comprising a finite state machine configured to determine said at least one path.

11. The image processing apparatus according to claim 10, wherein said finite state machine comprising a table of state transitions usable for determining the at least one path.

12. A method comprising:
    reading a first stripe of pixel values from an input image stored in a first memory, the first stripe comprising a first area extending across a portion in said input image, said first area comprising a row of pixel values;
    reading a second stripe of pixel values from the input image stored in the first memory, the second stripe comprising a second area extending across said portion in said input image, said second area comprising two or more rows of pixel values; and
    processing the first stripe and the second stripe by:
        determining an initial pixel location in an output image corresponding to an intersection between a boundary of a region of interest of said input image and at least one of said first stripe or said second stripe in a second memory;
        browsing at least one path from said initial pixel location across output image pixel locations to locate one or more output image pixel locations lying within said first area or said second area in said second memory, said browsing comprising testing at least one output image pixel location adjacent to a browsed output image pixel location and said first area or said second area to determine a subsequent path for said browsing;
        for one or more output image pixels within said first area or said second area of said input image:
            calculating a pixel value for said output image pixel location by interpolating a plurality of pixel values from said input image in said second memory surrounding said output image pixel location; and
            writing said pixel value to said first memory for storing said output image; and
        responsive to said browsing, replacing at least one of said first stripe or said second stripe with a subsequent stripe of input image information.

13. The method of claim 12, further comprising scaling dimensions of said output image based at least in part on a number of rows associated with said first area or said second area.

14. The method of claim 12, wherein said subsequent path is determined by a finite state machine based at least in part on a state table.

15. A non-transitory computer program product comprising a computer readable medium storing computer executable instructions that, when executed, configure a computing device to perform operations comprising:

reading a first stripe of pixel values from an input image stored in a first memory, the first stripe comprising a first area extending across a portion in said input image, said first area comprising a row of pixel values;

reading a second stripe of pixel values from the input image stored in the first memory, the second stripe comprising a second area extending across said portion in said input image, said second area comprising two or more rows of pixel values; and processing the first stripe and the second stripe by:
  determining an initial pixel location in an output image corresponding to an intersection between a boundary of a region of interest of said input image and at least one of said first stripe or said second stripe in a second memory;
  browsing at least one path from said initial pixel location across output image pixel locations to locate one or more output image pixel locations lying within said first area or said second area in said second memory, said browsing comprising testing at least one output image pixel location adjacent to a browsed output image pixel location and said first area or said second area to determine a subsequent path for said browsing;
  for one or more output image pixels within said first area or said second area of said input image:
    calculating a pixel value for said output image pixel location by interpolating a plurality of pixel values from said input image in said second memory surrounding said output image pixel location; and
    writing said pixel value to said first memory for storing said output image; and
  responsive to said browsing, replacing at least one of said first stripe or said second stripe with a subsequent stripe of input image information.

16. The non-transitory computer program product of claim 15, wherein said portion comprises a region of interest.

17. The non-transitory computer program product of claim 15, wherein said subsequent path is determined by a finite state machine based at least in part on a state table.

18. The non-transitory computer program product of claim 17, wherein said state table indicates a direction for said subsequent path relative to an end of said at least one path.

19. The non-transitory computer program product of claim 15, wherein said at least one path comprises a first path and said operations further comprising browsing from an end of said first path to a second path across output image pixel locations within said first area or said second area.

* * * * *